Figure 1:
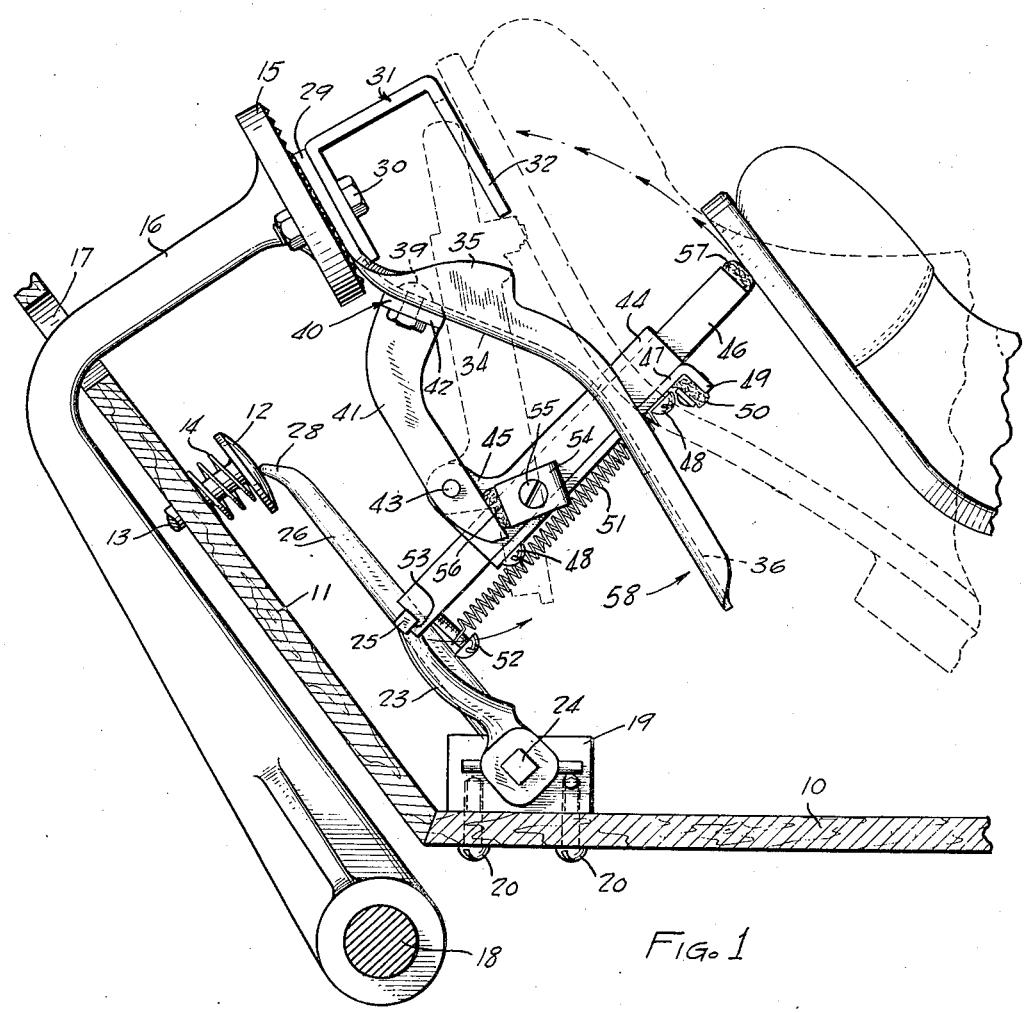

April 27, 1937.   A. D. KUMPF   2,078,390
SAFETY ATTACHMENT FOR THE OPERATING PEDALS OF A MOTOR VEHICLE
Filed July 17, 1936   2 Sheets-Sheet 1

INVENTOR.
AUGUST D. KUMPF
BY Joshua T. Hopts
ATTORNEY.

April 27, 1937.	A. D. KUMPF	2,078,390
SAFETY ATTACHMENT FOR THE OPERATING PEDALS OF A MOTOR VEHICLE
Filed July 17, 1936	2 Sheets-Sheet 2
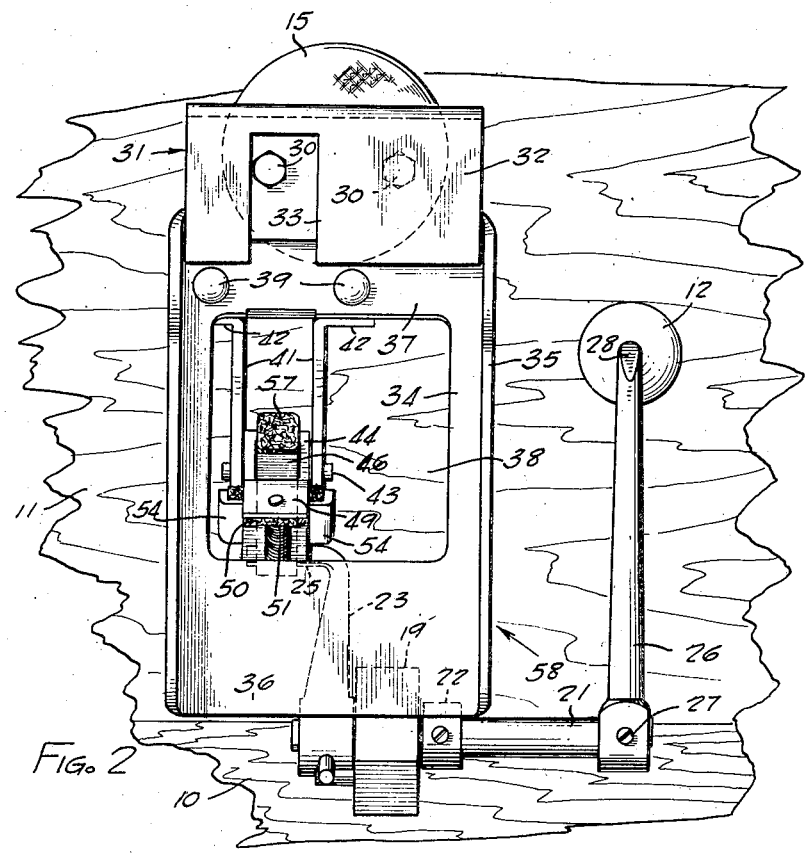
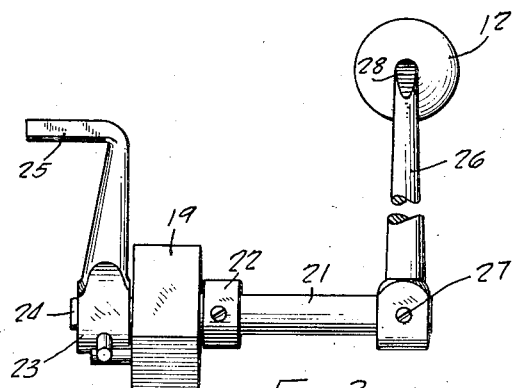
INVENTOR.
AUGUST D. KUMPF
BY
ATTORNEY.

Patented Apr. 27, 1937

2,078,390

UNITED STATES PATENT OFFICE 2,078,390

SAFETY ATTACHMENT FOR THE OPERATING PEDALS OF A MOTOR VEHICLE

August D. Kumpf, Philadelphia, Pa.

Application July 17, 1936, Serial No. 91,022

7 Claims. (Cl. 192—3)

This invention is related to motor vehicles, and is concerned primarily with the provision of a safety attachment intended to be applied to the operating pedals of the vehicle.

It is now a well accepted fact that the driver of an automobile, upon being confronted with a sudden emergency, exhibits a natural and involuntary tendency to press his foot forward, as in the application of the foot brake of the car. Inasmuch as the actions of the driver, under such conditions, are substantially instantaneous and made without thinking, very often the foot engages the accelerator, rather than the brake pedal, with serious injury very often resulting.

The present invention takes cognizance of this inevitable tendency on the part of the driver, and proposes the provision of a safety attachment which is designed to be applied to the brake pedal of the ordinary motor vehicle, and which attachment takes advantage of this natural forward movement of the foot of the driver to insure the release of the accelerator and apply the brake.

The invention has in view as an object the provision of a safety attachment of the character above described, which is carried by the brake pedal of a motor vehicle, and which includes an operating member designed to supplant the usual accelerator of the car, together with operative connections between said operating member and the accelerator, and which operating connections are breakable incident to forward movement of the operating pedal.

With this arrangement, under ordinary driving conditions the driver of the car will maintain his foot on this so-called substitute accelerator governing the speed of the car by the extent to which it is depressed. The substitute accelerator is rendered effective by a series of operating connections with the regular accelerator of the car. Should a sudden emergency arise, and the driver of the car jams his foot forward as to apply the brakes, the forward movement which will be imparted to the substitute accelerator by the foot causes a break in the operating connection whereby the regular accelerator is released, and under the influence of the spring which is commonly associated therewith will return to idling position. The forward movement of the foot of the driver will also be effective to apply the brakes, whereby the speed of the car is checked as quickly as the existing conditions permit.

Various other more detailed objects and advantages are associated with the carrying out of the above noted thoughts in a practical embodiment. These will in part become apparent, and in part be hereinafter stated, as the description of the invention proceeds.

The invention, therefore, comprises a safety attachment which is designed for application to the brake pedal of the motor vehicle, and which includes a substitute accelerator, together with operating connections between the substitute accelerator and the regular accelerator of the motor vehicle.

The substitute accelerator has a pivotal mounting, and the operating connections are breakable incident to pivotal movement of this substitute accelerator to release the regular accelerator of the car.

For a full and more complete understanding of the invention, reference may be had to the following description and accompanying drawings, wherein Figure 1 is a side view, partly in section and partly in elevation, of a safety attachment made in accordance with the precepts of this invention, Figure 2 is a top plan view of the attachment as applied to a brake pedal, and Figure 3 is a detailed view bringing out certain of the operating connections to the accelerator.

Referring now to the drawings, wherein like reference characters denote corresponding parts, the floor board of a motor vehicle is indicated fragmentarily at 10, and is shown as including a front upwardly inclined portion 11, in which is ordinarily mounted the accelerator of the car. In the illustrated embodiment, the accelerator takes the form of a pedal 12, which is connected by a plunger 13 with the gas supply of the vehicle. A spring 14 is interposed between the pedal 12 and floor board 11, and serves to normally maintain the pedal 12 in an upraised or "idling" position. That is, just enough gas is supplied to the motor to keep the engine idling. However, in order to impart any movement to the car it is necessary that the pedal 12 be depressed sufficiently to supply an adequate amount of gasoline to the engine.

A brake pedal is indicated at 15, and is shown as being mounted on an angularly shaped arm 16 that extends through an opening 17 formed in the floor board 11, and which angularly shaped arm 16 is pivotally mounted on an axis shown at 18.

When the pedal 15 is depressed, the brakes of the car are applied in the usual and well-known manner. Spring instrumentalities, not shown, normally serve to maintain the pedal 15 in the upraised or nonbraking position shown in Figure 1.

As shown in Figure 1 a block 19 is attached to the floor board 10 adjacent to the inclined portion 11 in any preferred manner, as for instance by screws shown at 20. This block 19 is formed with a transverse opening which constitutes a pivotal mounting for a shaft 21.

A collar 22 is carried by the shaft 21 and serves to limit sliding movement of the shaft with respect to the block 19 on one side, while an arm 23 is mounted on the extremity of the shaft on the side of the block 19 opposite from the collar 22, and serves to limit movement in the opposite direction.

It is evident that the collar 22 and arm 23 serve to accurately maintain the shaft 21 in position with respect to the block 19. It will be noted from Figure 1 that the extremity of the shaft 21 is of noncircular formation, as indicated at 24, and the structure of the arm 23 which engages this shaft is complementally shaped so as to establish a driving connection with the shaft 21.

The free extremity of the arm 23 is turned outwardly, as indicated at 25, and is engaged by other operating parts in a manner to be hereinafter described in detail.

At the extremity opposite from the arm 23 the shaft 21 also carries another arm 26, which is maintained in driving relation to the shaft 21 by the connection shown at 27. The free end of the arm 26 is turned down slightly, as shown at 28, and engages the accelerator pedal 12, as clearly brought out in Figure 1.

It is evident that if downward pressure is applied on the projection 25 of the arm 23 motion will be transmitted through the shaft 21 and arm 26 to depress the accelerator pedal 12, and if this pressure is released from the projection 25 the accelerator pedal 12 will be released and permitted to return to its upraised position under the influence of the spring 14.

A supporting framework for the substitute accelerator, to be later described, is indicated at 58, and is shown as including a flat portion 29 which engages the upper face of the brake pedal 15, and which is clamped thereagainst by bolts, indicated at 30. These bolts 30 also extend through one part of a U-shaped bracket member 31, which provides a pedal member 32 which is designed to replace the foot pedal 15; that is the foot of the driver will engage the pedal 32 when the brake is to be applied.

This pedal 32 is formed with a slot 33, for a purpose to be hereinafter described.

The supporting member 58 includes side portions 34 which are curved, as shown in Figure 1, and which are flanged as indicated at 35. These side portions 34 are connected at the lower end by a structure shown at 36, and at the upper end by a portion 37 that is substantially coextensive with the flat piece 29. The parts 34, 36 and 37 define an opening which is referred to as 38.

Connected to the part 37 of the supporting member 58, as by the bolts indicated at 39, is a depending brackets 40, which comprises spaced curved arms 41 that are flanged at their upper extremities, as shown at 42, to accommodate the bolts 40. Adjacent to their lower end a pivot pin 43 extends between the depending arms 41, and pivotally mounted on this pivot pin is a guide member 44.

It is notable that the guide member 44 has an ear 45 which is formed with an opening which receives the pivot pin 43. The guide 44 is of a channel construction, and the channel thereof slidably receives a bar 46, which constitutes the substitute accelerator of the attachment.

A plate, shown at 47, is secured to the guide 44, as by the screw members indicated at 48, and serves to maintain the bar 46 in the channel of the guide member. This plate 47 is formed at one end with a flange 49 on the under side of which is affixed a pad member 50, which may be made from any suitable flexible material, such as leather or a rubber composition.

The pad 50 projects slightly beyond the flange 49 to constitute a foot grip for a certain position of the apparatus, as will be described later.

A coil spring 51 is anchored at one end to the plate 47, as by one of the screws 48, and at its other extremity to a pin 52 which is carried by the bar 46. The same end of the bar 46 which carries the pin 52 is also formed with a notch, shown at 53, which normally receives the projection 25 on the arm 23.

The pivot pin 43 provides a pivotal mounting for the guide member 44, and the swinging movement of this guide member in one direction is limited by stops 54, which are shown as carried on each side of the guide 44. These stops 54 may be anchored to the guide as by the bolts indicated at 55, and the members 54 carry cushion elements in the form of pads, shown at 56, which may be of any suitable fibrous or rubber composition.

It is evident that the bolts 55 permit of adjustment of the members 54 to insure of the stops being rendered effective at any desired angular position of the guide 44, with respect to the bracket arms 41.

As above pointed out, the bar 46 is intended to constitute a substitute accelerator, and the upper extremity of this bar is provided with a foot pad, shown at 57, which is designed to be engaged by the foot of the driver, and which may be made from any suitable fibrous or rubber composition.

Under so-called "idling" conditions the various parts of the attachment will assume the full line position shown in Figure 1, in which the spring 51 will exert a tendency normally maintaining the substitute accelerator 46 in an upraised position, and in this position the notch 53 receives the projection 25 to establish a driving connection between the substitute accelerator 46 and the regular accelerator 12. It is notable that the spring 14, through the parts 12, 26, 21 and 23, serves to maintain the projection 25 in the notch 53.

During the driving of the car the driver may place his foot on the pad 57 to depress the substitute accelerator 46 and regulate the supply of gas as the speed requirements demand. However, should the driver be confronted with a sudden emergency his natural tendency will be to shove his foot forward, so as to apply the brakes.

This forward movement will rock the substitute accelerator 46, together with the guide structure 44, on which it is mounted, forwardly into the dotted line position shown in Figure 1. In this position the notched extremity 53 of the bar 46 becomes disengaged from the projection 25 of the arm 23, leaving the latter free. The spring 14 will now become effective to return the accelerator 12 to idling position.

As the driver's foot continues to move forwardly the accelerator 46 will be received in the slot 33, and the pad 50 becomes a foot grip against which the foot of the driver will engage to prevent slipping. Engagement of the driver's foot with the channel 32 applies the brakes in the usual manner.

When the normal driving of the car is to be resumed the guide 44 is swung outwardly by manual operation into position in which the notch 53 again receives the projection 25, to establish the driving connection from the substitute accelerator 46 to the regular accelerator 12.

While a preferred specific embodiment of the invention is hereinbefore set forth, it is to be clearly understood that I am not to be limited to the exact construction illustrated and described, because various modifications of these details may be provided in putting the invention into practice within the purview of the appended claims.

I claim:

1. In combination with a motor vehicle including a brake pedal and an accelerator, supporting framework carried by the brake pedal, a guide member pivotally carried by the supporting framework, a substitute accelerator slidably mounted in said guide member, operating connections between said substitute accelerator and the accelerator of the vehicle, said operating connections being breakable incident to pivotal movement of the guide member.

2. A safety attachment of the character described comprising a supporting framework adapted to be mounted on the brake pedal of a motor vehicle, a guide member pivotally mounted on said framework, means for limiting pivotal movement of said guide member in one direction, said guide member being freely movable in a direction toward the brake pedal of the motor vehicle, a substitute accelerator operatively carried by said guide member, connections for operatively connecting the substitute accelerator with the regular accelerator of the vehicle, said connections being breakable incident to forward pivoting movement of the guide member.

3. A safety attachment of the character described comprising a supporting framework adapted to be mounted on the brake pedal of a motor vehicle, a substitute pedal also carried by the brake pedal of the motor vehicle and spaced therefrom, a guide member carried by the supporting framework and movable with respect thereto, a substitute accelerator operatively carried by the guide member, said guide member being movable into a position in which the substitute accelerator is positioned beneath the substitute pedal, and connections for operatively connecting the substitute accelerator with the regular accelerator of the motor vehicle, said connections being breakable incident to movement of the substitute accelerator toward the substitute pedal.

4. The combination with a motor vehicle including a floor board, an accelerator operatively mounted on said floor board, and a brake pedal extending through said floor board, of a safety attachment comprising a supporting framework carried by the brake pedal, a guide member pivotally carried by the supporting framework, a substitute accelerator slidably carried by said guide member, a shaft pivotally mounted on the floor board of the vehicle, said shaft having an arm engaging one end of the substitute accelerator, and a second arm on said shaft engaging the accelerator of the vehicle, said substitute accelerator and first mentioned arm being disengageable incident to pivotal movement of the guide.

5. The combination with a motor vehicle including a floor board, an accelerator operatively mounted on said floor board, and a brake pedal extending through said floor board, of a safety attachment comprising a supporting framework carried by the brake pedal, a guide member pivotally carried by the supporting framework, a substitute accelerator slidably carried by said guide member, a shaft pivotally mounted on the floor board of the vehicle, said shaft having an arm engaging one end of the substitute accelerator, a second arm on said shaft engaging the accelerator of the vehicle, means associated with said substitute accelerator for maintaining the same in an upraised position, and means for maintaining one end of said substitute accelerator in engagement with the first mentioned arm, said means being adapted to be rendered ineffective incident to pivotal movement of the guide.

6. A safety attachment of the character described comprising a supporting framework adapted to be mounted on the brake pedal of a motor vehicle, a guide pivotally mounted on said supporting framework, means for limiting the pivotal movement of said guide in one direction, said guide being freely pivotal towards the brake pedal, a substitute accelerator slidably carried by the guide and having a notched extremity, an arm formed with a projection received in said notch, said arm being carried by a shaft, said shaft being adapted to be pivotally mounted on a motor vehicle, and a second arm on said shaft adapted to engage the accelerator of the motor vehicle, said arm being adapted to become disengaged from the notch of the accelerator incident to pivotal movement of the guide member.

7. The combination with a motor vehicle including a floor board, an accelerator operatively mounted on the floor board, and a brake pedal extending through said floor board, of a safety attachment comprising a supporting framework attached to the brake pedal, a substitute pedal spaced from said brake pedal and formed with a recess, a guide member pivotally mounted on the supporting framework, a substitute accelerator slidably carried by said guide, a spring for normally maintaining said substitute accelerator in an upraised position, said substitute accelerator having an upper end adapted to be engaged by the foot of the driver, and a lower end which is notched, means for limiting pivotal movement of the guide member in one direction, said guide member being freely pivotal towards the substitute pedal whereby the substitute accelerator is adapted to pass through the recess in the substitute pedal and be positioned therebeneath, a block carried by the floor board of the vehicle, a shaft pivotally mounted in said block, an arm extending from one end of the shaft and formed with a projection which is received in the notched end of the substitute accelerator, and a second arm extending from the other end of said arm in operative engagement with the accelerator of the vehicle, said pivotal movement of the guide member being effective to disengage the notched end of the substitute accelerator from the projection on said arm.

AUGUST D. KUMPF.